UNITED STATES PATENT OFFICE.

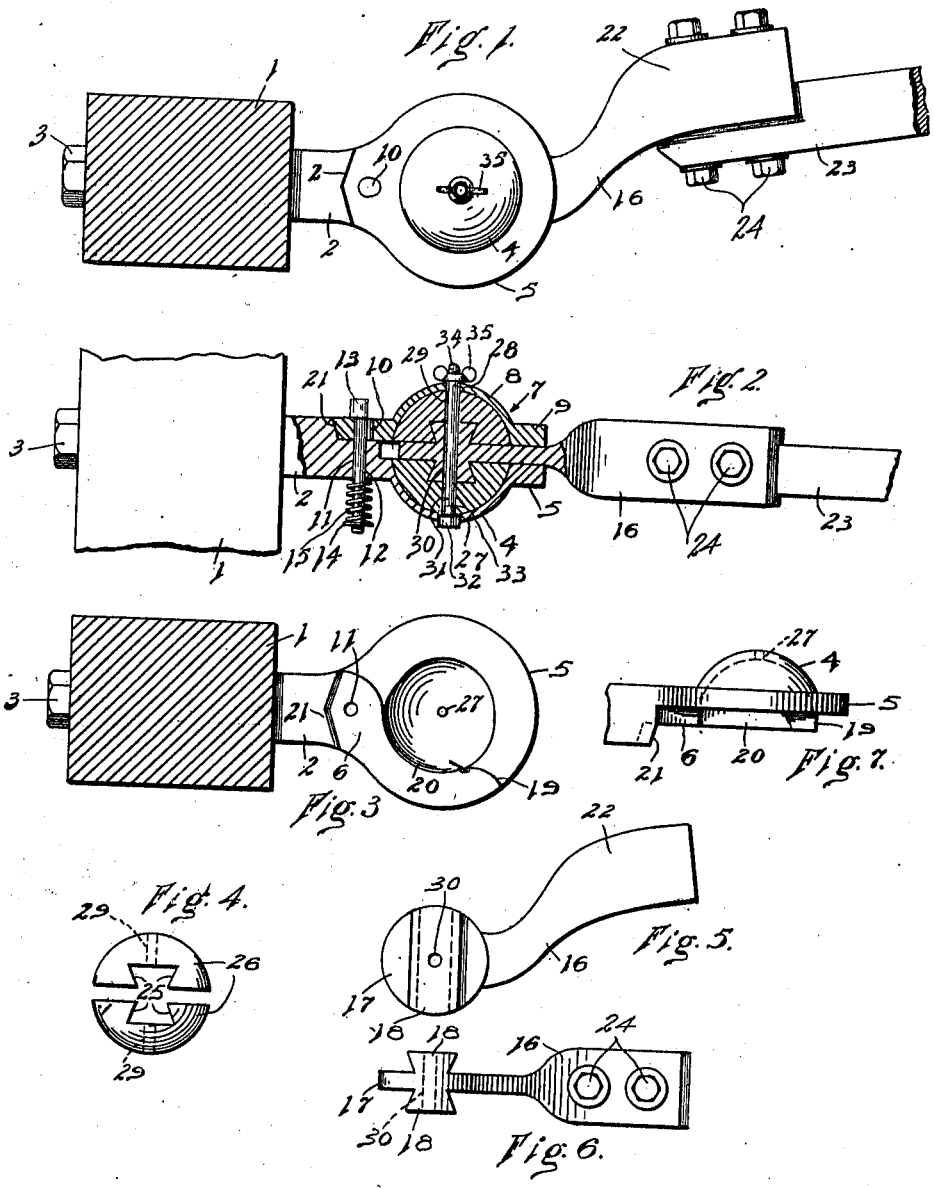

JULES F. JAQUET, OF BALLSTON, VIRGINIA.

THILL-COUPLING.

974,387.

Specification of Letters Patent.

Patented Nov. 1, 1910.

Application filed October 30, 1909. Serial No. 525,471.

*To all whom it may concern:*

Be it known that I, JULES F. JAQUET, a citizen of the United States, residing at Ballston, in the county of Alexandria and State of Virginia, have invented certain new and useful Improvements in Thill-Couplings, of which the following is a specification.

My invention relates to thill couplings and more particularly to a ball-bearing thill coupling.

An important object of my invention is to provide a thill coupling so constructed that the principal wear caused by friction will be exerted upon parts which are removable, whereby the worn parts may be renewed and the life of the coupling is prolonged.

A further object of my invention is to provide a device of the above character which will not rattle, and which will be simple in construction and highly durable.

My invention consists generally of a spherical socket which is secured to the axle of the vehicle, and a ball secured to the thill adapted to be arranged within the spherical socket.

In the accompanying drawings, forming a part of this specification, and in which like numerals are used to designate like parts throughout the same, Figure 1 is a side view of my device. Fig. 2 is a horizontal sectional view of the same. Fig. 3 is a side view of the member secured to the axle, parts thereof being removed. Fig. 4 is a plan view of the friction members. Fig. 5 is a side view of the member upon which the friction members are arranged, and Fig. 6 is a plan view of the same. Fig. 7 is a fragmentary plan view of the member shown in Fig. 3.

In the accompanying drawings, in which the preferred embodiment of my invention is disclosed, 1 designates an axle of a vehicle upon which is secured a body portion 2, which extends through the axle and is provided upon its rear end with a nut 3. The body portion 2 has formed at its forward end and upon one side thereof a semi-spherical casing 4, which is extended to form a circumferential edge 5. The body portion 2 has its forward end upon the side opposite to the casing 4 provided with a recess 6, which is adapted to receive the rear end of a removable casing 7 comprising centrally arranged semi-spherical portion 8 which is extended to form a circumferential edge 9. The rear portion of the removable casing 7 is provided with an opening 10, which is adapted to register with an opening 11 passing through the body portion 2, and within which is arranged a pin 12 provided with a head 13, which is sufficiently small to pass through the opening 10. The head 13 is formed upon one side of the pin 12 and is adapted to engage one side of the opening 10 above the edge 9, as shown in Fig. 2. The opposite end of the pin 12 is provided with a washer 14, between which and the body portion 2 is arranged a spiral spring 15 which surrounds the pin 12. By this construction the pin 12 will be normally held in the position shown in Fig. 2, but the same may be rotated so that the head 13 will register with the opening 10, whereby the detachable casing 7 may be removed.

It is to be understood that when the casings 4 and 7 are arranged as shown in Fig. 2, that they form a spherical socket within which is arranged one end of a connecting member 16, which is provided with an enlarged circular rear end 17, upon which are arranged alined diametrical dove-tailed projections 18 upon the opposite sides thereof. The reduced portion 6 of the body portion 2 is extended forwardly and terminates at a point 19. The inner curved side 20 of the portion 6 is concave to conform to the curvature of the inner surface of the semi-spherical casing 4.

As shown in Fig. 2, the circumferential edge 9 of the detachable casing 7 is arranged upon the portion 6, which causes the circumferential edges 5 and 9 to be spaced away from each other from the point 19 to the end 21 of the body portion 2. The body portion of the connecting member 16 extends forwardly and is enlarged as at 22 for engagement with a thill 23, to which it is secured by means of suitable bolts 24 or the like. The dove-tailed projections 18 are adapted for insertion within corresponding openings 25 formed upon the flat side of friction members 26, which have convex outer surfaces. As shown in Fig. 2 when the friction members 26 are arranged upon the circular end 17, the same form with the circular end 17, a sphere, which is adapted to snugly fit within the spherical socket formed by the semi-spherical portions 4 and 8. The semi-spherical portions 4 and 8 are provided with alined openings 27 and 28, respectively, which register with diametrical openings 29, within the friction members 26, which in turn register with a central opening 30, within the circular end 17. A pin 31 passes through the openings 27 and 28 and the opening registering therewith as shown in Fig. 2, and is provided upon one end with a square head 32, which is adapted to fit within a corresponding recess 33 formed upon the semispherical portion 4 adjacent the opening 27. The opposite end of the pin 31 extending through the opening 28 is screw threaded as at 34 for the reception of a thumb nut 35.

The object in providing the square opening 33, which receives the square head 32 of the pin 31, is to form a means for preventing the pin 31 from having relative rotary movement, whereby the thumb nut 35 will not readily unscrew from the pin. By reference to Fig. 2, it will be obvious that the pin 31 is considerably smaller than the openings through which the same extends. This is done in order that all friction may be taken off the pin 31. The spherical socket comprising the semi-spherical portions 4 and 8 are preferably constructed of steel, while the friction members 26 may be formed of iron or some metal softer than steel. It is obvious that in the use of my device the greatest amount of friction will occur between the forward part of the friction members 26 and the spherical socket. In the course of time, should the friction members 26 become worn upon their forward portions, the device may be readily separated and the friction members reversed or removed and renewed if desired.

Having fully described my invention, I claim:

1. A device of the character described, comprising a spherical socket adapted to be secured to the axle of a vehicle and having a removable side, a connecting member arranged within said spherical socket and provided with dove-tailed projections, friction members provided with recesses adapted to coöperate with said dove-tailed projections, whereby the same may be removably secured to said connecting member for forming a spherical portion therewith, and means detachably holding said removable side in its normal position.

2. A device of the character described, comprising a spherical socket adapted to be secured to the axle of a vehicle and having a removable side, a connecting member provided with an enlarged flat substantially circular end, dove-tailed projections arranged upon said circular end, substantially semispherical metallic friction members arranged upon said circular end, and provided with corresponding openings for coöperation with said dove-tailed projections, said friction members forming with said circular end substantially a sphere of which said friction members form the greater portion, and said dove-tailed projections being arranged substantially vertical when in their operative positions.

3. A device of the character described, comprising a socket adapted to be secured to the axle of a vehicle, a connecting member arranged within said socket and provided upon its opposite sides with dove-tailed projections, and friction members provided with recesses adapted to receive said dove-tailed projections.

In testimony whereof I affix my signature in presence of two witnesses.

JULES F. JAQUET.

Witnesses:
C. L. PARKER,
JAMES L. CRAWFORD.